US008422360B2

(12) United States Patent
Shimizu et al.

(10) Patent No.: US 8,422,360 B2
(45) Date of Patent: Apr. 16, 2013

(54) ROUTE SWITCHING METHOD, SERVER, BOUNDARY NODE APPARATUS, ROUTE SWITCHING SYSTEM, AND ROUTE SWITCHING PROGRAM

(75) Inventors: Kaori Shimizu, Tokyo (JP); Ichiro Inoue, Tokyo (JP); Kohei Shiomoto, Tokyo (JP); Shigeo Urushidani, Tokyo (JP)

(73) Assignees: Nippon Telegraph and Telephone Corporation, Tokyo (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 238 days.

(21) Appl. No.: 12/999,113

(22) PCT Filed: Jun. 30, 2009

(86) PCT No.: PCT/JP2009/061925
§ 371 (c)(1),
(2), (4) Date: Dec. 15, 2010

(87) PCT Pub. No.: WO2010/001883
PCT Pub. Date: Jan. 7, 2010

(65) Prior Publication Data
US 2011/0090785 A1 Apr. 21, 2011

(30) Foreign Application Priority Data

Jun. 30, 2008 (JP) .................. 2008-169950

(51) Int. Cl.
*H04J 1/00* (2006.01)
*H04J 12/26* (2006.01)
(52) U.S. Cl.
USPC ......................................... 370/218
(58) Field of Classification Search .................. None
See application file for complete search history.

(56) References Cited

U.S. PATENT DOCUMENTS 7,035,259 B2    4/2006    Nomura et al.
(Continued)

FOREIGN PATENT DOCUMENTS

EP    1 898 584 A1    3/2008
JP    6-037783 A      2/1994
(Continued)

OTHER PUBLICATIONS

Shimizu et al., "Examination and Evaluation Concerning Multi-Layer Netowork Operation Method" IEICE Technical Report ICM2008-28, Jul. 3, 2008, vol. 108, No. 123., pp. 25-30.
(Continued)

*Primary Examiner* — Ayaz Sheikh
*Assistant Examiner* — Blanche Wong
(74) *Attorney, Agent, or Firm* — Carrier Blackman & Associates, P.C.; Joseph P. Carrier; William D. Blackman

(57) ABSTRACT

A route switching method for switching a route in a core network that accommodates service networks including user node apparatuses by use of a server storing path information that includes, in every time frame, a route for a working path and a route for a backup path to be switched over from the working path, both of the working path and the backup path established between two boundary node apparatuses each of which is located on a boundary between the service network and the core network. The server calculates, in response to the connection request from the user node apparatus, a route for a working path and a route for a backup path, and requests the boundary node apparatus to establish this working path. The server can send the route for the backup path to the boundary node apparatus before a failure occurs in the core network. The boundary node apparatus establishes the working path in response to the establishment request for establishing the working path from the server, and can perform a quick recovery by switching over the working path to the backup path when a failure occurs in the core network.

17 Claims, 7 Drawing Sheets

U.S. PATENT DOCUMENTS

| | | |
|---|---|---|
| 7,248,561 B2 | 7/2007 | Ishibashi et al. |
| 7,652,987 B2 | 1/2010 | Qing et al. |
| 7,787,362 B2 | 8/2010 | Xu |
| 2004/0193724 A1 | 9/2004 | Dziong et al. |
| 2005/0169313 A1 | 8/2005 | Okamura et al. |

FOREIGN PATENT DOCUMENTS

| | | |
|---|---|---|
| JP | 2000-341289 A | 12/2000 |
| JP | 2001-045009 A | 2/2001 |
| JP | 2001-251343 A | 9/2001 |
| JP | 2002-094510 A | 3/2002 |
| JP | 2003-229889 A | 8/2003 |
| JP | 2004-165794 A | 6/2004 |
| JP | 2004-304456 A | 10/2004 |
| JP | 2005-159983 A | 6/2005 |
| JP | 2008-503117 T | 1/2008 |

OTHER PUBLICATIONS

J. P. Lang, Ed. Sonos et al., RSVP-TE Extensions in Support of End-to-End Generalized Multi-Protocol Label Switching (GMPLS) Recovery, Network Working Group Request for Comments: 4872; Updates: 3471; Category: Standards Track, pp. 1-31.

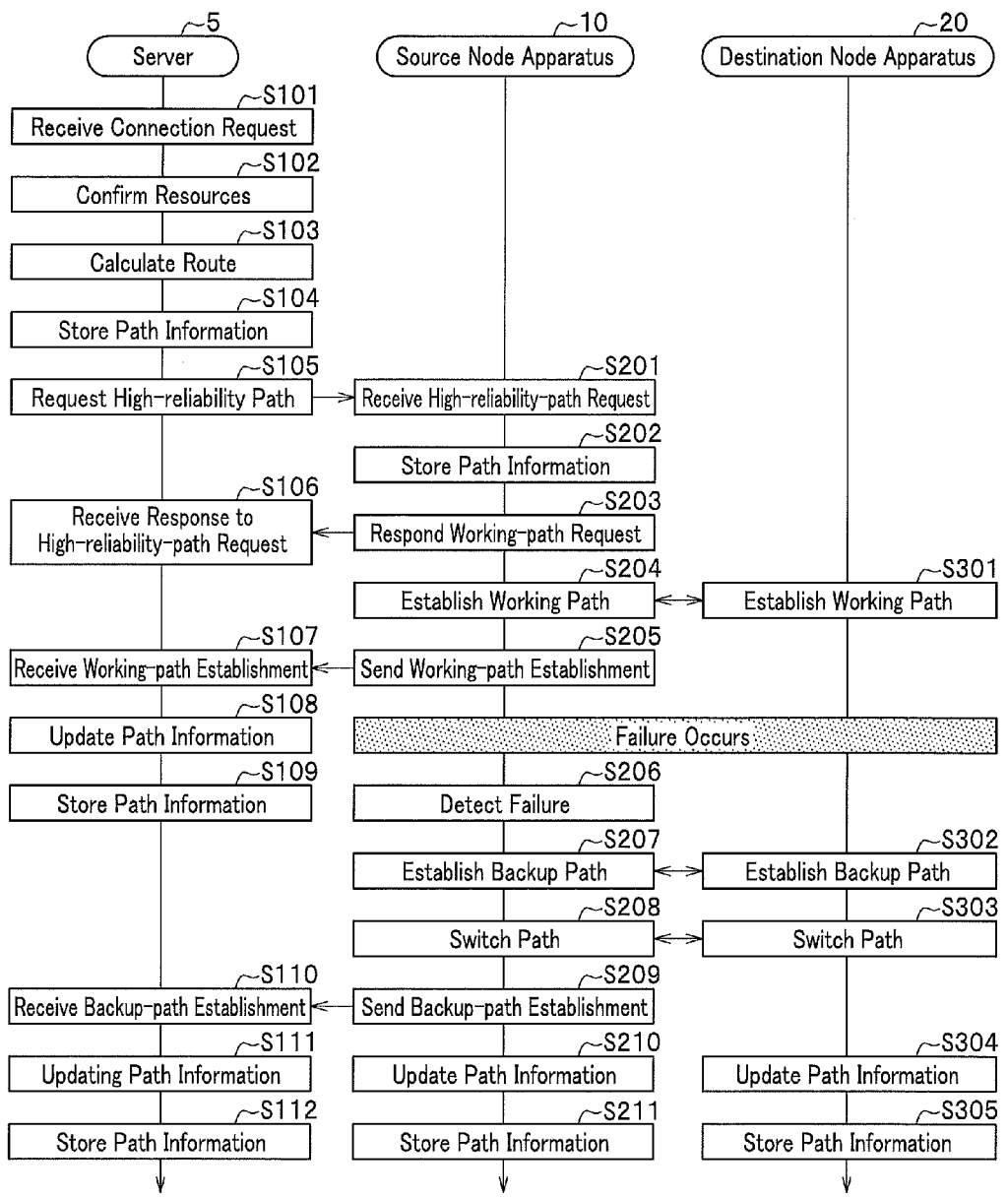

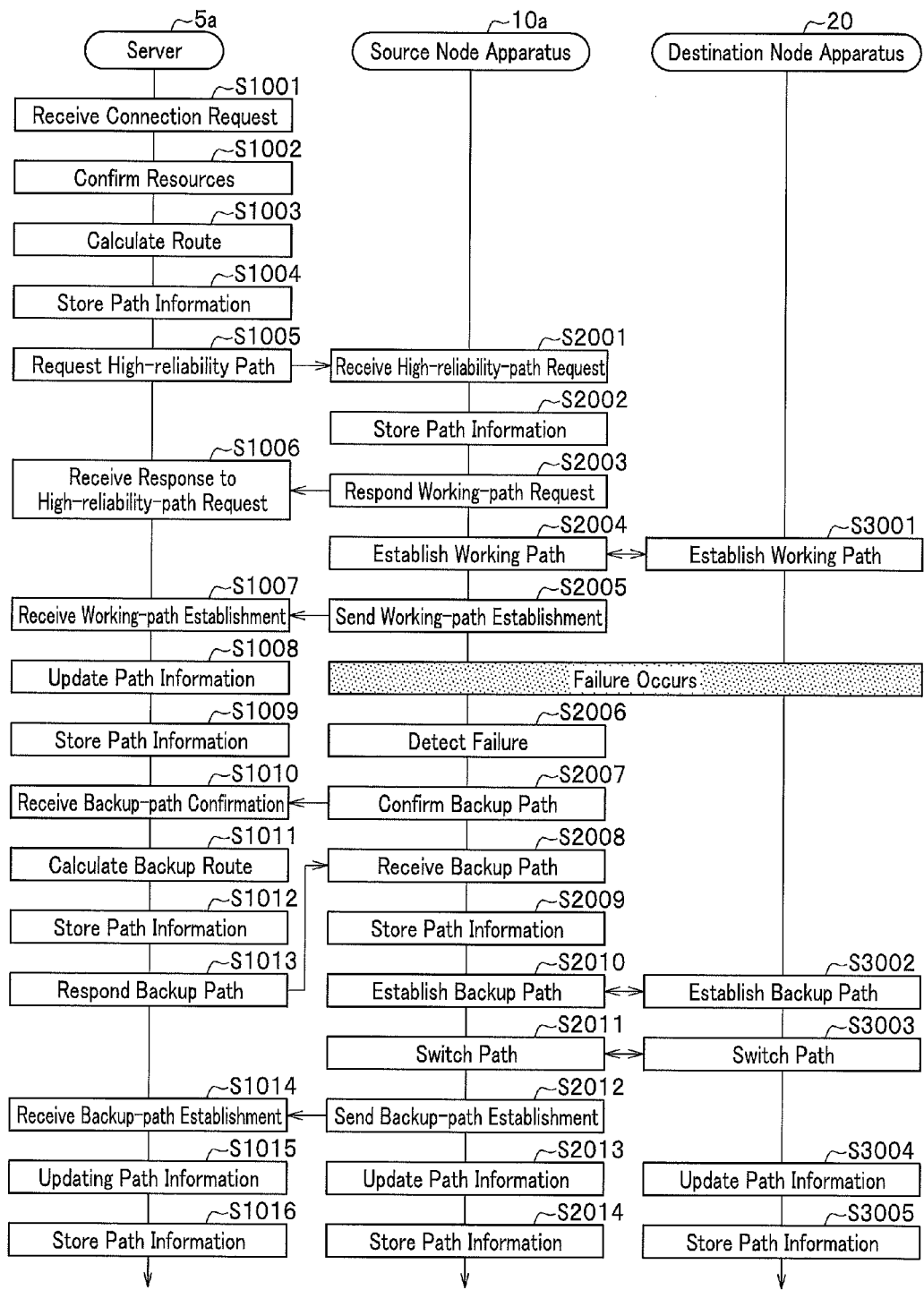

ROUTE SWITCHING METHOD, SERVER, BOUNDARY NODE APPARATUS, ROUTE SWITCHING SYSTEM, AND ROUTE SWITCHING PROGRAM

BACKGROUND OF THE INVENTION

1. Field of the Invention

The present invention relates to a network switching technique for switching over a route in a core network that accommodates a service network including a user node apparatus from a working path to a backup path at the time of a failure occurrence, by using a server that manages path information including routes for working paths and backup paths in the time-axis.

2. Description of the Related Art

There has been known a technique, which in response to an establishment request for establishing a high-reliability path (i.e. a working path and a backup path) in a core network, in the light of resources of a current core network, establishes a high-reliability path and switches over this path to a backup path at the time of a failure occurrence (for example, see the non-patent document 1).

PRIOR ART DOCUMENT

[Non-patent document 1] J. P. Lang et al, RSVP-TE Extensions in Support of End-to-End Generalized Multi-Protocol Label Switching (GMPLS) Recovery, RFC4872

DISCLOSURE OF THE INVENTION

Problems to be Solved by the Invention

However, in such a scheme disclosed in the non-patent document 1, it is difficult to establish a high-reliability path with consideration of the time axis as well as grasping resources of the core network. In addition, it is impossible to provide such a high-reliability path in response to a connection request from a user (user's on-demand request).

The present invention has an object to address the above-mentioned problems by providing a route switching technique to establish a high-reliability path in response to a user's connection request with consideration of the time axis.

SUMMARY OF THE INVENTION

In order to address the above problems, the route switching method according to the first aspect of the present invention switches a route in a core network that accommodates service networks including user node apparatuses by use of a server storing path information that includes, in every time frame, a route for a working path and a route for a backup path to be switched over from the working path, both of the working path and the backup path established between two boundary node apparatuses, each of which is located on a boundary between the service network and the core network. The method includes, performed by the server, a connection request receiving step for receiving from the user node apparatus a connection request for connecting to the core network, a route calculation step for, in response to this connection request, confirming available resources in the path information and calculating a route for the working path and a route for the backup path, and a high-reliability-path requesting step for sending the boundary node apparatus the calculated routes for the working path and for the backup path along with an establishment request for establishing the working path; and, performed by the boundary node apparatus, a working path establishing step for, in response to a working-path-establishment request, establishing the working path calculated by the server between the boundary node apparatuses via relay node apparatuses that relay the core network, and a failure detection step for detecting a failure in the core network; when a failure is detected in the core network, performed by the boundary node apparatus, a backup path establishment step for, based on the route for the backup path received from the server, establishing the backup path between the boundary node apparatuses via the relay node apparatuses, a path switching step for switching over the working path to the backup path established, and a backup-path-establishment sending step for sending the server the route for the backup path switched over from the working path; and, performed by the sever, a backup path establishment receiving step for receiving the route for the backup path switched over from the working path by the boundary node apparatus, and a path information updating step for updating the path information based on the route for the backup path switched over from the working path by the boundary node apparatus.

According to the above steps, the server manages the path information that includes a route for a working path and a route for a backup path in every time frame as information indicating resources of the core network. Thus, the server can manage, for example, a working path used by the user node apparatus in every time frame. The server calculates, in response to the connection request from the user node apparatus, a route for a working path and a route for a backup path, and requests the boundary node apparatus to establish this working path. Thus, the server can send the route for the backup path to the boundary node apparatus before a failure occurs in the core network. Then, the boundary node apparatus establishes the working path in response to the establishment request for establishing the working path from the server. Further, the boundary node apparatus can perform a quick recovery by switching over the working path to the backup path when a failure occurs in the core network.

A route switching method according to the second aspect of the present invention switches a route in a core network that accommodates service networks including user node apparatuses by use of a server storing path information that includes, in every time frame, a route for a working path and a route for a backup path to be switched over from the working path, both of the working path and the backup path established between two boundary node apparatuses, each of which is located on a boundary between the service network and the core network. The method includes, performed by the server, a connection request receiving step for receiving from the user node apparatus a connection request for connecting to the core network, a route calculation step for, in response to the connection request, confirming available resources based on the path information and calculating a route of the working path, and a high-reliability-path request step for sending the boundary node apparatus the calculated routes for the working path and an establish request for establishing the working path; performed by the boundary node apparatus, a working-path establishment step for, in response to a working-path-establishment request, establishing the working path calculated by the server between the boundary node apparatuses via relay node apparatuses that relay the core network, and a failure detecting step for detecting a failure in the core network; when a failure is detected in the core network, performed by the boundary node apparatus, a step for sending the server a confirmation request for the backup path; performed by the server, a backup route calculating step for calculating a route for the backup path in response to the backup path confirmation request sent from the boundary node apparatus, and a backup path responding step for sending the boundary node apparatus the calculated route for the backup path; performed by the boundary node apparatus, a backup path establishing step for establishing the backup path between the boundary node apparatuses via the relay node apparatuses based on the route for the backup path received from the server, a path switching step for switching over the working path to the backup path established, and a backup-path-establishment sending step for sending the route for backup path switched over from the working path; and performed by the server, a backup-path-establishment receiving step for receiving a route for the backup path switched over from the working path by the boundary node apparatus, and a path information updating step for updating the path information based on the route for the backup path switched over from the working path by the boundary node apparatus.

According to the above steps, the server manages the path information that includes a route for a working path and a route for a backup path in every time frame as information indicating resources of the core network. Thus, the server can manage, for example, a working path used by the user node apparatus in every time frame. The server calculates, in response to the connection request from the user node apparatus, a route for a working path, and requests the boundary node apparatus to establish this working path. Then, the boundary node apparatus establishes the working path in response to the establishment request for establishing the working path from the server. The boundary node apparatus sends the server a confirmation request for confirming the backup path when a failure occurs in the core network. Then the server calculates a route for the backup path using the path information at the time of a failure occurrence in the core network, and sends this route for the backup path to the boundary node apparatus. Thus, the server can calculate the route for the backup path using the latest path information at the time of a failure occurrence. Moreover, the boundary node apparatus can perform a recovery at the time of a failure occurrence by switching over the working path to the backup path.

A server according to the third aspect of the present invention is coupled with a core network that accommodates service networks including user node apparatuses, and the server stores path information that includes, in every time frame, a route for a working path and a route for a backup path, both of the working path and the backup path established between two boundary node apparatuses each located on a boundary between the service network and the core network, and the server calculates a route for the working path and a route for the backup path to be switched over from the working path when a failure occurs in the core network. The server includes a connection-request receiving unit for receiving from the user node apparatus a connection request for connecting to the core network; a route calculating unit for, in response to the connection request, calculating a route for the working path and a route for the backup path based on the path information; a high-reliability-path requesting unit for sending the boundary node apparatus the calculated routes for the working path and for the backup path along with an establishment request for establishing the working path; a backup-path-establishment receiving unit for receiving from the boundary node apparatus the route for the backup path switched over from the working path by the boundary node apparatus when a failure occurs in the core network; and a path-information updating unit for updating the path information based on the route for the backup path switched over from the working path by the boundary node apparatus.

According to the above configuration, the server manages the path information that includes a route for a working path and a route for a backup path in every time frame as information indicating resources of the core network. Thus, the server manages, for example, a working path used by the user node apparatus in every time frame. The server calculates the backup path at the approximately same time of calculating the working path when the connection request sent from the user node apparatus, and sends this route for the backup path to the boundary node apparatus. Thus, the server can sends the route for the backup path to the boundary node apparatus before a failure occurs in the core network so as to perform a quick recovery.

A server according to the fourth aspect of the present invention is coupled with a core network that accommodates service networks including user node apparatuses, and the server stores path information that includes, in every time frame, a route for a working path and a route for a backup path, both of the working path and the backup path established between two boundary node apparatuses each located on a boundary between the service network and the core network, and the server calculates a route for the working path and a route for the backup path to be switched over from the working path when a failure occurs in the core network. The server includes a connection-request receiving unit for receiving from the user node apparatus a connection request for connecting to the core network; a route calculating unit for, in response to the connection request, calculating a route for the working path based on the path information; a backup path-route calculating unit for calculating a route for the backup path in response to a confirmation request for confirming the backup path sent from the boundary node apparatus when a failure is detected in the core network; a high-reliability-path requesting unit for sending the boundary node apparatus the calculated routes for the working path and the backup path along with an establishment request for establishing the working path; a backup-path-establishment receiving unit for receiving from the boundary node apparatus the route for the backup path switched over from the working path by the boundary node apparatus when a failure occurs in the core network; and a path-information updating unit for updating the path information based on the route for the backup path switched over from the working path by the boundary node apparatus.

According to the above configuration, the server manages the path information that includes a route for a working path and a route for a backup path in every time frame as information indicating resources of the core network. Thus, the server manages, for example, a working path used by the user node apparatus in every time frame. The server calculates the route for the backup path using the path information at the time of a failure occurrence, and sends this route for the backup path to the boundary node apparatus. The server sends the boundary node apparatus the route for the backup path calculated using the latest path information, thus it is possible to prevent an occasion in which this backup path is actually failed in establishment; therefore, it is possible to secure a recovery.

In the server of the third and fourth aspects of the present invention, a server according to the fifth aspect of the present invention further includes a resource management unit for managing the path information including a route for a reservation path established between the boundary node apparatuses at a reservation time that is preset, a status of the reservation path indicating either "reserved" or "established", and the reservation time, wherein the high-reliability-path requesting unit sends the route and the reservation time for the reservation path that are managed by the resource management unit to the boundary node server.

According to the above configuration, the server manages path information including a route for a reservation path and a reservation time of the reservation path. The server confirms available resources and calculates a route for a path in accordance with an on-demanded request, and sends this as a reservation path to the boundary node apparatus. Thus, the server can allow a particular user node apparatus to use this reservation path.

A boundary node apparatus according to the sixth aspect of the present invention establishes, in response to an establishment request for establishing a working path sent from a server, a working path between the boundary node apparatus and another boundary node apparatus, each of which is located on a boundary between a service network including a user node apparatus and a core network that accommodates the service network. The boundary node apparatus includes a working-path establishing unit for establishing, in response to the establishment request for establishing the working path, the working path calculated by the server between the boundary node apparatus and another boundary node apparatus via relay node apparatuses that relay the core network; a failure detecting unit for detecting a failure in the core network while the working path is being established; a backup-path establishing unit for establishing the backup path between the boundary node apparatus and the another boundary node apparatus, based on a route for the backup path switched over from the working path received from the server when the failure detecting unit detects a failure in the core network; a path switching unit for switching over the working path to the backup path established; and a backup-path-establishment sending unit for sending the server the route for the backup path switched over from the working path.

According to the above configuration, the boundary node apparatus receives a route for a working path and a route for a backup path from the server. The boundary node apparatus establishes a working path in response to the establishment request for the working path sent from the server. Then, the boundary node apparatus switches over the working path to a backup path when a failure occurs in the core network. Thus, the boundary node apparatus switches over the working path to the backup path when a failure occurs in the core network, thereby to perform a quick recovery.

A boundary node apparatus according to the seventh aspect of the present invention establishes, in response to an establishment request for establishing a working path sent from a server, a working path between the boundary node apparatus and another boundary node apparatus, each of which is located on a boundary between a service network including a user node apparatus and a core network that accommodates the service network. The boundary node apparatus includes a working-path establishing unit for, in response to the establishment request for establishing the working path, establishing the working path calculated by the server between the boundary node apparatus and another boundary node apparatus via relay node apparatuses that relay the core network; a failure detecting unit for detecting a failure in the core network while the working path is being established; a backup path confirmation unit for sending a confirmation request for confirming the backup path switched over from the working path by the server when the failure detecting unit detects a failure in the core network; a backup-path establishing unit for establishing the backup path between the boundary node apparatuses via the relay node apparatus based on the route for the backup path received from the server; a path switching unit for switching over the working path to the backup path established; and a backup-path-establishment sending unit for sending the server the route for the backup path switched over from the working path.

According to the above configuration, the boundary node apparatus receives a route for a working path from the server. Then, the boundary node apparatus establishes the working path in response to the establishment request for establishing the working path sent from the server. The boundary node apparatus sends a confirmation request for confirming a route for the backup path to the server when a failure occurs in the core network. The boundary node apparatus receives the route for the backup path calculated by using the path information at the time of a failure occurrence in the core network in response to this confirmation request, and switches over the working path to the backup path. Thus, the boundary node apparatus can switch over the working path to the backup path calculated using the latest path information at the time of a failure occurrence, thereby to perform a recovery.

A boundary node apparatus according to the eighth aspect of the present invention, in the boundary node apparatuses of the sixth and seventh aspects, receives from the server a route for a reservation path to be established between the boundary node apparatus and the another boundary node apparatus at a reservation time, and the working-path establishing unit establishes the reservation path between the boundary node apparatus and the another boundary node apparatus.

According to the above configuration, boundary node apparatus confirms, through the server, available resources, and calculates a route for a path in response to an on-demand request, and the boundary node receives this as a reservation path from the server at a reservation time. The boundary node apparatus establishes this reservation path between the boundary node apparatus and another boundary node apparatus. Thus, the boundary node apparatus allows a particular user node apparatus to use this reservation path.

Each route switching system according to ninth to seventeenth aspects of the present invention includes the server either of the third to fifth aspects of the present invention, and the boundary node apparatus either of the sixth to eighth aspects of the present invention.

According to the above configuration, the server manages the path information including a route for a working path and a route for a backup path in every time frame as information indicating resources of the core network. Thus, the server can manage, in every time frame, the user node apparatus using the working path, for example. Then, the server calculates a route for a working path in response the connection request sent from the user node apparatus, and requests the boundary node apparatus to establish the working path. The boundary node apparatus establishes the working path in response to the establishment request for establishing the working path. The server calculates the backup path at the approximately same time of calculating the working path, or in response to the confirmation request for confirming the backup path sent from the boundary node apparatus. The boundary node apparatus switches over the working path to the backup path at the time of a failure occurrence. Thus, it is possible to switch over from the working path to the backup path at the time of a failure occurrence, thereby to perform a recovery.

Each route switching program according to the eighteenth to twentieth aspect of the present invention allows a computer to function the sever according to either of the third to fifth aspects of the present invention as each unit constituting this server.

EFFECTS OF THE INVENTION

According to the present invention, it is possible to provide a network switching technique that establishes a high-reliability path with consideration of the time axis, in response to a connection request from a user. According to the present invention, since resources of the network can be managed in the time axis, it is also possible to enhance a usage efficiency of the network and realize a flexible operation thereof.

BRIEF DESCRIPTION OF THE DRAWINGS

FIG. 3 shows a flow chart showing operations of a route switching system 1 of FIG. 2.

FIG. 5 is a flow chart showing operations of a route switching system 1a of FIG. 4.

DETAILED DESCRIPTIONS OF THE PREFERRED EMBODIMENTS

Hereinafter, descriptions will be provided on embodiments of the present invention with reference to the drawings when necessary. Note that, in each embodiment, the same numerical references are used for components having the same functions, and detailed descriptions will be omitted.

First Embodiment

Outline of Route Switching System

Figure 1:
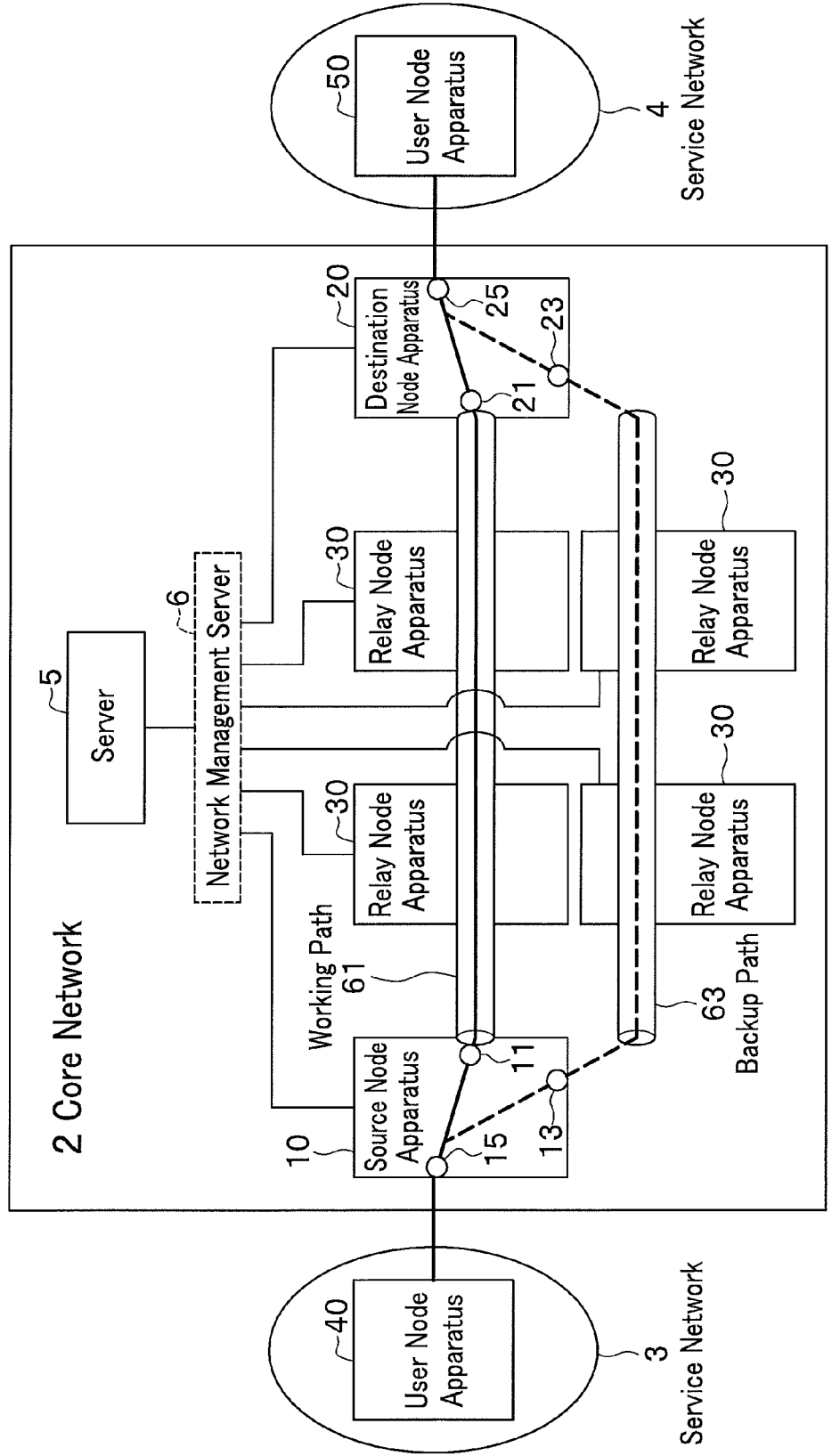
FIG. 1 is an illustrative drawing showing a schematic outline of a route switching system according to a first embodiment of the present invention.

FIG. 1 is an illustrative drawing showing a schematic outline of a route switching system according to the first embodiment of the present invention. The route switching system 1 includes a core network 2, plural service networks 3, 4, a server 5 and a network management server 6. In the core network 2, a working path 61 is established via relay node apparatuses 30 between a source node apparatus 10 (a boundary node apparatus) and a destination node 20 (another boundary node apparatus). Then, the route switching system 1 provides a resource (bandwidth) of the established working path 61 for user node apparatuses 40, 50 included in the service networks 3, 4. Specifically, bandwidth of the working path 61 is used for communication between the user node apparatuses 40, 50. In addition, when the route switching system 1 cannot provide a resource of the working path 61 for the user node apparatuses 40, 50, the route switching system 1 establishes a backup path 63 and switches over the working path 61 to this backup path 63, and then provides a resource of the backup path 63 for the user node apparatuses 40, 50.

The server 5 serves for accommodating path information, whose details will be described later on.

The network management server 6 serves for intermediating between the server 5 and the source node apparatus 10. The route switching system 1 may not include the network management server 6, and in such a case, the server 5 and the source node apparatus 10 may be connected with each other.

The source node apparatus 10 includes CPU (Central Processing Unit), RAM (Random Access Memory), HDD (Hard Disk Drive), and NIC (Network Interface Card) used for communication, and is an apparatus such as an optical cross-connection (OXC), a router and a switch or the like. The source node apparatus 10 is configured to establish a path in conformity with RSVP-TE (Resource reServation Protocol-Traffic Engineering) such as RFC3473.

The source node apparatus 10 includes interfaces 11, 13, 15. The interface 11 is an interface for connecting to a working path 61. The interface 13 is an interface for connecting to a backup path 63. The interface 15 is an interface for connecting to the service network 3.

The destination node apparatus 20 is an apparatus similar to the source node apparatus 10, and includes interfaces 21, 23, 25. The interface 21 is an interface for connecting to a working path 61. The interface 23 is an interface for connecting to a backup path 63. And the interface 25 is an interface for connecting to a service network 4.

Now, the source node apparatus 10 sends a path establishment request to the destination node apparatus 20, and establishes a working path 61 whose end points are the interface 11 of the source node apparatus 10 and the interface 21 of the destination node apparatus 20, for example. When a failure occurs in the working path 61 of the core network 2, the source node apparatus 10 establishes a backup path 63 both of whose end points are the interface 13 of the source node apparatus 10 and the interface 23 of the destination node apparatus 20. Specifically, a backup path 63 works as a detour for a working path 61, and when a failure occurs in the working path 61 in the core network 2, the route is switched over from the working path 61 to the backup path 63 so as to transfer a user traffic.

The relay node apparatus 30 is an apparatus such as an optical cross connection (OXC), a router and a switch or the like. In FIG. 1, a working path 61 is relayed through two relay node apparatuses 30, and a backup path 63 is through with two relay node apparatuses 30, but the number thereof is not limited to this.

The user node apparatuses 40, 50 are an apparatus similar to the relay node apparatus 30, and are such as an optical cross connection (OCX), a router and a switch or the like. The user node apparatus 40 is connected to the source node apparatus 10. The user node apparatus 50 is connected to the destination node apparatus 20.

A working path 61 and a backup path 63 are an optical path constituted by an optical fiber such as GM PLS-LSP (Generalized Multi-Protocol Label Switching-Label Switched Path), and can be used as a resource having a predetermined bandwidth. As shown in FIG. 1, in the core network 2, a high-reliability path is constituted by a working path 61 or a backup path 63.

[Configuration of Server]

Figure 2A:
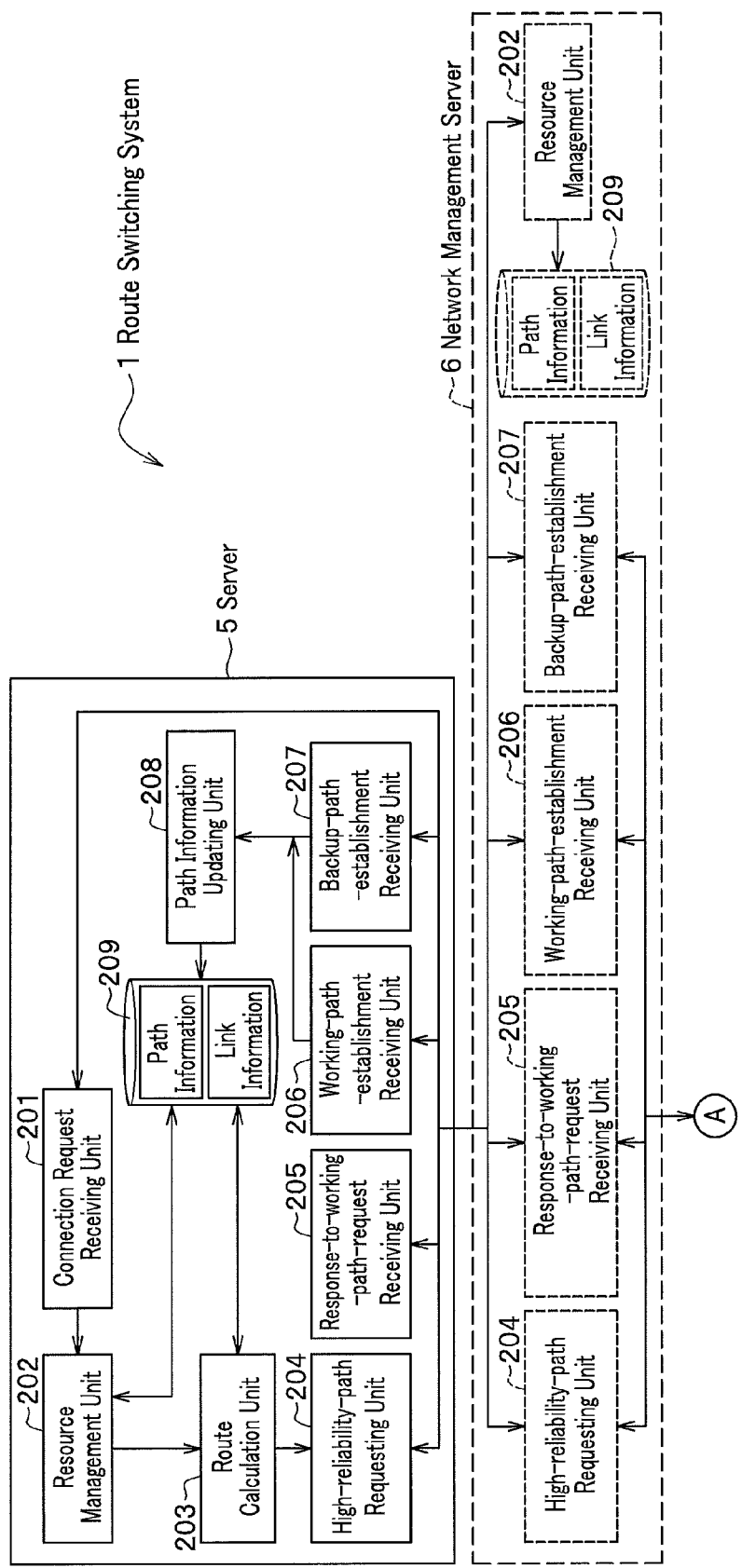
FIG. 2A is a block diagram showing each configuration of a server, a network management server, a source node apparatus, a relay node apparatus and a destination node apparatus.
Figure 2B:
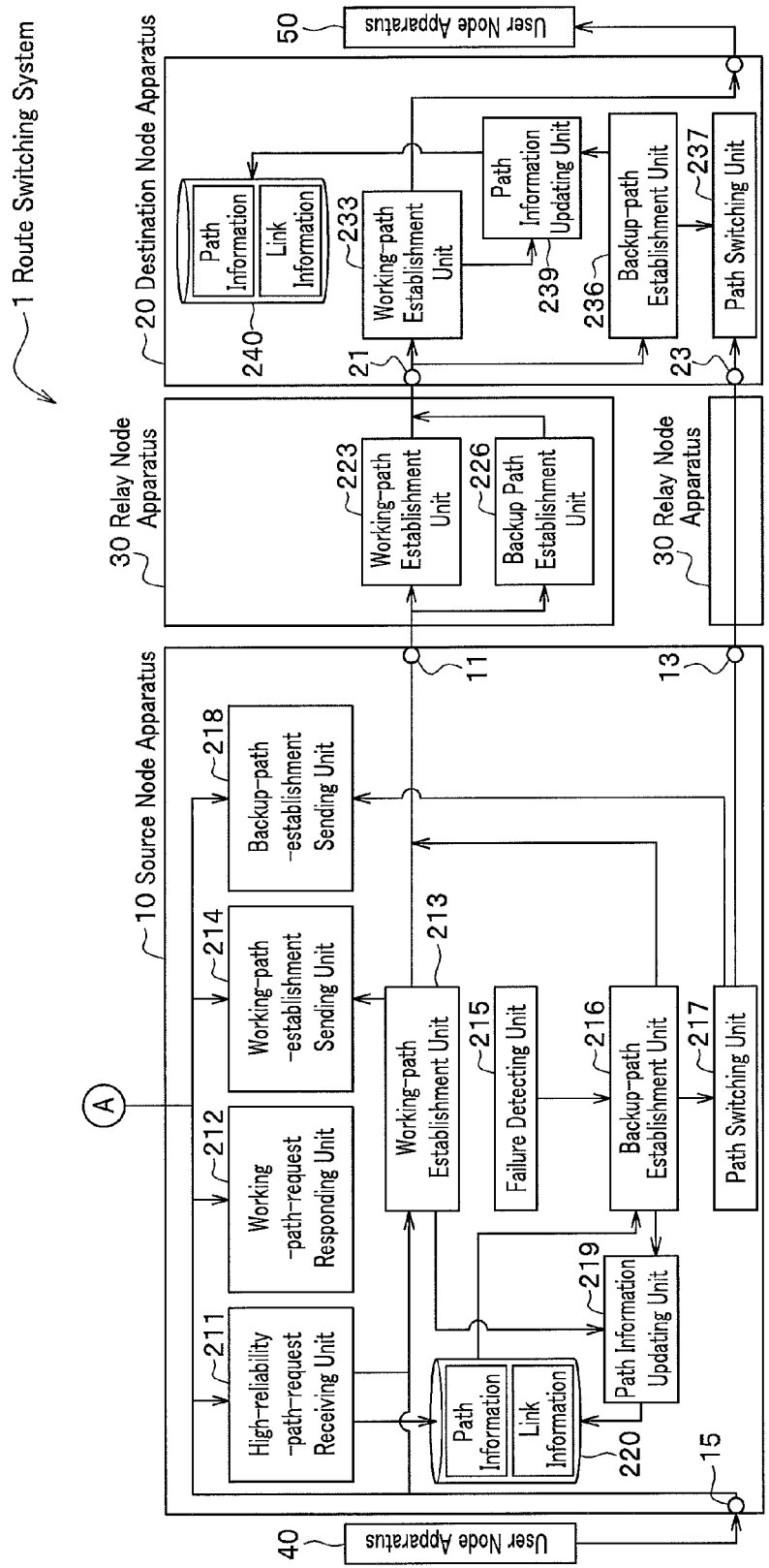
FIG. 2B is a block diagram showing each configuration of a server, a network management server, a source node apparatus, a relay node apparatus and a destination node apparatus.

FIGS. 2A and 2B are block diagrams showing each configuration of the server apparatus, the network management server apparatus, the source node apparatus, the relay node apparatuses and the destination node apparatus.

As shown in FIG. 2A, the server 5 includes a connection-request receiving unit 201, a resource management unit 202, a route calculating unit 203, a high-reliability-path requesting unit 204, a response-to-working-path-request receiving unit 205, a working-path-establishment receiving unit 206, a backup-path-establishment receiving unit 207, a path information updating unit 208 and a storage unit 209.

The connection-request receiving unit 201 serves for receiving a connection request (on-demand request) for connecting to the core network 2 from the user node apparatus 40. The user node apparatus 40 may send this connection request via the source node apparatus 10 to the server 5 or directly to the server 5. The resource management unit 202 will be described later on.

In response to the connection request received by the connection-request receiving unit 201, the route calculating unit 203 calculates a route for a working path 61 based on path information stored in the storage unit 209 described later on. The route calculating unit 203 calculates a route for a backup path 63 in response to this connection request.

Hereinafter, detailed descriptions will be provided on a route calculation for a route between a user port (point A) of the source node apparatus 10 serving as an end point of a high-reliability path and a user point (point Z) of the destination node apparatus 20 serving as an end point of the high-reliability path. First, the route calculating unit 203 generates a logical (virtual) interface in the source node apparatus 10 serving as the end point of the high-reliability path. The route calculating unit 203 confirms whether or not there is any route having A and Z end points among high-reliability paths (working paths 61) by use of the Edmond-Karp method. If there is such a route of a high-reliability path (working path 61), the route calculating unit 203 confirms whether or not there is any route with virtual interfaces serving as A and Z end points among high-reliability paths (backup paths 63), which is different from that of the high-reliability path (working path 61). If there is the above route of the high-reliability path (working path 61), this route of the high-reliability path (working path 61) is stored in the storage unit 209. The route calculating unit 203 further confirms whether or not there is any route for a reservation path via a high-reliability path (logical IF) by use of the Edmond-Karp method. If there is such a reservation path, the route for this reservation path is stored in the path information of the storage unit 209.

The high-reliability-path requesting unit 204 serves for sending routes for a working path 61 and a backup path 63 that are calculated by the route calculating unit 203, and sending an establishment request for establishing a working path 61 to the source node apparatus 10. In this way, since the route calculating unit 203 calculates a route for a backup path 63 and sends this route to the source node apparatus 10 in advance, when the source node apparatus 10 detects a failure, it is possible to quickly switch over the route from the working path 61 to the backup path 63.

The response-to-working-path-request receiving unit 205 serves for receiving from the source node apparatus 10 a message indicating that an establishment request for establishing a working path 61 has been received.

The working-path-establishment receiving unit 206 serves for receiving from the source node apparatus 10 a message indicating that a working path 61 has been established along with a route for this working path 61.

The backup-path-establishment receiving unit 207 serves for receiving from the source node apparatus 10 a route for a backup path 63 switched over from a working path 61 by the source node apparatus 10 at the time of a failure occurrence. The path information updating unit 208 will be described later on.

The storage unit 209 may be constituted by a general memory or HDD, for example, and serves for storing path information and link information. Link information may include node information, UNI (User Network Interface) link information and node apparatus link information, for example. The path information may include working path information, working path route information, backup path information, backup path route information, reservation path information and reservation path route information, for example.

The node information may include information regarding each node apparatus of the source node apparatus 10, the destination node apparatus 20 and the relay node apparatus 30, etc., including data items, for example, of node apparatus IDs, node apparatus addresses, node apparatus names and node apparatus types (such as TDM, Ether, Lambda), for example.

UNI link information includes information regarding connections between the user node apparatus 40 and the source node apparatus 10, and between the destination node apparatus 20 and the user node apparatus 50, including data items, for example, of UNI port IDs, user node apparatus IDs, boundary node apparatus IDs, UNI port types (such as TDM, Ether), bandwidths, section names, installation locations and user names.

The node apparatus link information may include information regarding a connection between the source node apparatus 10 and the destination node apparatus 20, including data items, for example, of link IDs, source node apparatus IDs, destination node apparatus addresses, source node apparatus interface IDs, source node apparatus installation locations, destination node apparatus IDs, destination node apparatus addresses, destination node apparatus interface IDs, destination node apparatus installation locations, link attributes (protection attributes), link types (such as TDM, Ether), bandwidths and section names, for example.

The working path information may include information regarding working paths 61, including data items, for example, of path IDs, path identifiers, source node apparatus IDs, destination node apparatus IDs, start times, end times, statuses indicating one of "not-established", "reserved" and "established", required bandwidths, path attributes and path logical end points, for example. The backup path information may include information regarding backup paths 63 such as data items similar to those of the working path information, for example.

The working path route information may include information regarding routes for working paths 61 including data items, for example, of path IDs, path identifiers, route information regarding working paths 61 between respective source node apparatuses 10 and respective destination node apparatuses 20, for example. The backup path route information may include information regarding routes for backup paths 63 such as data items similar to those of the working path route information, for example.

The reservation path information may include information regarding the reservation path, including data items, for example, of reservation IDs, reservation user IDs, service types, source node apparatus IDs, source UNI port IDs, destination node apparatus IDs, destination UNI port IDs, reservation start times, reservation end times, statuses indicating either "reserved" or "established", required bandwidths and path attributes, for example. Herein a reservation path denotes a high-reliability path (i.e. a working path 61 and a backup path 63) that is provided for particular user node apparatuses 40, 50 during a time frame from a predetermined reservation start time to a predetermined reservation end time.

The reservation path route information may include information regarding routes for reservation paths such as reservation IDs and route information of reservation paths between respective source node apparatuses 10 and respective destination node apparatuses 20.

The path information updating unit 208 serves for updating path information stored in the storage unit 209. Herein, when the working-path-establishment receiving unit 206 receives a message indicating an establishment of a working path 61, the path information updating unit 208 updates a status in the working path information regarding this working path 61 from "not-established" to "established". When the backup-path-establishment receiving unit 207 receives a route for a backup path 63, the path information updating unit 208 updates a status in the backup path information regarding this backup path 63 from "not-established" to "established". Then, the path information updating unit 208 updates a status in the working path information regarding the established working path 61 from "established" to "not-established".

The resource management unit 202 manages resources of the core network 2 in the time axis, that is, manages reservation paths of the core network 2 in every time frame. The resource management unit 202 refers to the reservation path information, and if there is set a reservation path (a status of the reservation path information is set as "reserved"), the resource management unit 202 requests the high-reliability-path requesting unit 204 to send a route, a reservation start time and a reservation end time of this reservation path. Then, the high-reliability-path requesting unit 204 sends the source node apparatus 10 a route, a reservation start time and a reservation end time of this reservation path, as a working path 61 to be reserved by the source node apparatus 10 during a reservation time frame.

The resource management unit 202 uses (NW whole resource information)—(whole path information involved in a time frame from a reservation start time to a reservation end time). The NW whole resource information denotes node information, UNI (User Network Interface) link information and node apparatus link information. This whole path information involved in a time frame from a reservation start time to a reservation end time denotes the working path information, the working path route information, the backup path information, the backup path route information, the reservation path information and the reservation path route information in a time frame from a reservation start time to a reservation end time. Since a reservation path is established using a resource of a high-reliability path, the resource management unit 202 needs to confirm path information when establishing a reservation path. Thus, resources of the core network 2 are managed in the time axis so that it is possible to realize a flexible operation of the core network 2, for instance, it is possible to secure a reservation path in predetermined user node apparatuses 40, 50 during a particular reservation time frame. The reservation path information may be set by the resource management unit 202 in response to a request from the user node apparatuses 40, 50 or may be previously set by an operator.

[Configuration of Network Management Server]

The network management server 6 includes a resource management unit 202, a high-reliability-path requesting unit 204, a response-to-working-path-request receiving unit 205, a working-path-establishment receiving unit 206, a backup-path-establishment receiving unit 207 and a storage unit 209.

Each unit included in the network management server 6 is the same as that of the server 5, therefore detailed descriptions thereof will be omitted.

[Configuration of Source Node Apparatus]

As shown in FIG. 2B, the source node apparatus 10 includes a high-reliability-path-request receiving unit 211, a working-path-request responding unit 212, a working-path establishing unit 213, a working-path-establishment sending unit 214, a failure detecting unit 215, a backup-path establishing unit 216, a path switching unit 217, a backup-path-establishment sending unit 218, a path-information updating unit 219 and a storage unit 220.

The high-reliability-path-request receiving unit 211 serves for receiving from the server 5 routes for a working path 61 and a backup path 63 and an establishment request for establishing this working path 61. Then, the high-reliability-path-request receiving unit 211 stores the received routes for the working path 61 and the backup path 63 in the path information of the storage unit 220. When receiving a route, a reservation start time and a reservation end time for a reservation path, the high-reliability-path-request receiving unit 211 stores this received data in the reservation path information of the storage unit 220.

The working-path-request responding unit 212 serves for sending the server 5 a message indicating that an establishment request for establishing a working path 61 has been received. The working-path establishing unit 213 will be described later on. The working-path-establishment sending unit 214 serves for sending the server 5 a route for the working path 61 established by the working-path establishing unit 213.

In response to the establishment request for establishing the working path 61 received by the high-reliability-path-request receiving unit 211, the working-path establishing unit 213 establishes the working path 61 of which the establishment request has been received by the high-reliability-path-request receiving unit 211 between the source node apparatus 10 and the destination node apparatus 20. The working-path establishing unit 213 sends the destination node apparatus 20 the establishment request for establishing the working path 61 along with the routes for the working path 61 and the backup path 63 via the relay node apparatus 30. The working-path establishing unit 213 establishes only the working path 61 if there is specified a link attribute (protection attribute) indicating that the backup path 63 is to be established after a failure occurs. When receiving a route for a reservation path, the working-path establishing unit 213 may secure this reservation path in the same manner as that of the working path 61.

The failure detecting unit 215 serves for detecting a failure in the core network 2, by use of an RSVP-TE for example.

The backup-path establishing unit 216 serves for establishing a backup path 63 between the source node apparatus 10 and the destination node apparatus 20 based on a route for a backup paths 63 stored in the storage unit 220. At this time, the backup-path establishing unit 216 sends the backup-path establishing unit 236 of the destination node apparatus 20 an establishment request for establishing the backup path 63 via the backup-path establishing unit 226 of the relay node apparatus 30.

The path switching unit 217 serves for switching over a working path 61 to a backup path 63 established by the backup-path establishing unit 216.

The backup-path establishment sending unit 218 serves for sending the server 5 a route for the backup path 63 switched over from the working path 61 by the path switching unit 217.

The storage unit 220 may be constituted by a general memory or HDD, and serves for storing path information and link information. Path information and link information herein are the same as those in the above descriptions, thus detailed descriptions thereof will be omitted.

The path-information updating unit 219 serves for updating path information stored in the storage unit 220. When the working-path establishing unit 213 establishes a working path 61, the path-information updating unit 219 updates a status of the working path information regarding this working path 61 from "not-established" to "established". When the path switching unit 217 switches over the working path 61 to the backup path 63, the path-information updating unit 219 updates a status of the backup path information regarding this backup path 63 from "not-established" to "established". Then, the path-information updating unit 219 updates a status of the working path information regarding this working path 61 switched over to the backup path 63 from "established" to "not-established".

[Configuration of Relay Node Apparatus]

As shown in FIG. 2B, the relay node apparatus 30 includes the working-path establishing unit 223 and the backup-path establishing unit 226.

In response to an establishment request for establishing a working path 61 sent from the source node apparatus 10, the working-path establishing unit 223 establishes a working path 61. At this time, the working-path establishing unit 223 sends the establishment request for establishing the working path 61 received from the source node apparatus 10 along with routes for the working path 61 and the backup path 63 to the working-path establishing unit 233 of the destination node apparatus 20. When receiving a route for a reservation path, the working-path establishment 223 may secure this reservation path in the same manner as that of securing the working path 61.

The backup-path establishing unit 226 serves for establishing a backup path 63 in response to an establishment request for establishing the backup path 63 sent from the source node apparatus 10. At this time, the backup-path establishing unit 226 sends the backup-path establishing unit 236 of the destination node apparatus 20 an establishment request for establishing the backup path 63 received from the source node apparatus 10.

[Configuration of Destination Node Apparatus]

As shown in FIG. 2B, the destination node apparatus 20 includes the working-path establishing unit 233, the backup-path establishing unit 236, the path switching unit 237, the path information updating unit 239 and the storage unit 240.

The working-path establishing unit 233 serves for establishing a working path 61 in response to an establishment request for establishing the working path 61 sent from the relay node apparatus 30. The working-path establishing unit 233 may secure a reservation path in the same manner as that of securing the working path 61.

The backup-path establishing unit 236 serves for establishing a backup path 63 in response to an establishment request for establishing the backup path 63 sent from the relay node apparatus 30.

The path switching unit 237 serves for switching over a working path 61 established by the working-path establishing unit 233 to a backup path 63 established by the backup-path establishing unit 236.

The storage unit 240 may be constituted by a general memory or HDD for example, and serves for storing path information and link information. Path information and link information herein are the same as those in the above descriptions, thus detailed descriptions thereof will be omitted.

The path information updating unit 239 serves for storing routes of the working path 61 and the backup path 63 received by the working-path establishing unit 233 in the storage unit 240 and updating path information stored in the storage unit 240. At this time, when the working-path establishing unit 233 establishes a working path 61, the path-information updating unit 239 updates a status of the working path information regarding this working path 61 from "not-established" to "established". When the path switching unit 237 switches over a working path 61 to a backup path 63, the path-information updating unit 239 updates a status of the backup path information regarding this backup path 63 from "not-established" to "established". Then, the path-information updating unit 239 updates a status of the working path information regarding the working path 61 switched over to the backup path 63 from "established" to "not-established".

[Operations of Route Switching System]

FIG. 3 shows a flow chart showing operations of the route switching system 1 of FIGS. 2A and 2B. First, descriptions will be provided on operations of the route switching system 1 to establish a working path 61 (see FIGS. 1, 2 when necessary). In FIG. 3 and the following descriptions, the network management server and the relay node apparatus are omitted.

<Establishment of Working Path>

The server 5 receives, through the connection-request receiving unit 201, a connection request for connecting to the core network 2 (on-demand request) from the user node apparatus 40 (Step S101). The server 5 confirms resources of the core network 2 through the resource management unit 202 (Step S102). The server 5 calculates, through the route calculating unit 203, a route for a working path 61 based on the path information stored in the storage unit 209 in response to the connection request received by the connection-request receiving unit 201. The server 5 calculates a route for the backup path 63 through the route calculating unit 203 (Step S103).

Following Step S103, the server 5 stores the calculated routes for the working path 61 and the backup path 63 in the path information through the route calculating unit 203 (Step S104). Then, the server 5 sends, through the high-reliability-path requesting unit 204, the routes for the working path 61 and the backup path 63 and the establishment request for establishing the working path 61 to the source node apparatus 10 (Step S105).

Following the operation at Step S105, the source node apparatus 10 receives, through the high-reliability-path-request receiving unit 211, the routes for the working path 61 and the backup path 63 and the establishment request for establishing the working path 61 from the server 5 (Step S201). The source node apparatus 10 stores, through the high-reliability-path-request receiving unit 211, the received routes for the working path 61 and the backup path 63 in the path information of the storage unit 220 (Step S202). The source node apparatus 10 sends the server 5, through the working-path-request responding unit 212, a message indicating that the establishment request for establishing the working path 61 has been received (Step S203).

Following the operation at Step S203, the server 5 receives, through the response-to-working-path-request receiving unit 205, the message indicating that the establishment request for establishing the working path 61 has been received from the source node apparatus 10 (Step S106).

Following the operation at Step S203, the source node apparatus 10 sends, through the working-path establishing unit 213, the establishment request for establishing the working path 61 to the destination node apparatus 20 via the relay node apparatus 30, so as to establish the working path 61

(Step S204). In response to the operation at Step S204, the destination node apparatus 20 establishes, through the working-path establishing unit 233, the working path 61 in response to the establishment request for establishing the working path 61 sent from the source node apparatus 10 (Step S301).

Then, the source node apparatus 10 sends the server 5, through the working-path-establishment sending unit 214, the route for the working path 61 established by the working-path establishing unit 213 (Step S205).

Following the operation at Step S205, the server 5 receives, through the working-path-establishment receiving unit 206, the message indicating the establishment of the working path 61 along with the route for this working path 61 from the source node apparatus 10 (Step S107). When receiving the message indicating the establishment of the working path 61 through the path information updating unit 208, the server 5 updates a status of the working path information regarding the working path 61 from "not-established" to "established" (Step S108), and stores this status in the storage unit 209 (Step S109). Through the above operations, the route switching system 1 secures the working path 61.

<Switching Over to Backup Path>

Hereinafter, descriptions will be provided on operations of the route switching system 1 to switch over a route from the working path 61 to the backup path 63 when a failure occurs in the working path 61 of the core network 2.

The source node apparatus 10 detects a failure of the core network 2 through the failure detecting unit 215 (Step S206). The source node apparatus 10 sends, through the backup-path establishing unit 216, an establishment request for establishing the backup path 63 to the destination node apparatus 20 via the relay node apparatus 30 (Step S207). In response to the operation at Step S207, the destination node apparatus 20 establishes, through the backup-path establishing unit 236, the backup path 63 in accordance with the establishment request for establishing the backup path 63 sent from the destination node apparatus 10 (Step S302).

Following the operation at Step S207, the source node apparatus 10 switches, through the path switching unit 217, the working path 61 over to the backup path 63 established by the backup-path establishing unit 216 (Step S208). The source node apparatus 10 sends, through the backup-path-establishment sending unit 218, the route for the backup path 63 switched over from the working path 61 by the path switching unit 217 (Step S209). Through the path-information updating unit 219, the source node apparatus 10 updates a status of the backup path information regarding this backup path 63 from "not-established" to "established", and also updates a status of the working path information regarding the working path 61 switched over to the backup path 63 from "established" to "not-established" (Step S210), and then stores the updated statuses in the storage unit 209 (Step S211).

When the operation at Step S208 is executed, the destination node apparatus 20 switches, through the path switching unit 237, the working path 61 over to the backup path 63 established by the backup-path establishing unit 236 (Step S303). The destination node apparatus 20 updates, through the path-information updating unit 239, a status of the backup path information regarding this backup path 63 from "not-established" to "established", and also updates a status of the working path information regarding this working path 61 switched over to the backup path 61 from "established" to "not-established" (Step S304), and then stores the updated statuses in the storage unit 209 (Step S305).

Following the operation at Step S209, the server 5 receives from the source node apparatus 10, through the backup-path-establishment receiving unit 207, the route for the backup path 63 switched over from the working path 1 by the source node apparatus 10 (Step S110). The server 5 updates, through the path information updating unit 208, a status of the backup path information regarding this backup path 63 from "not-established" to "established", and also updates a status of the working path information regarding this working path 6161 switched over to the backup path 63 from "established" to "not-established" (Step S111), and stores the above updates in the storage unit 209 (Step S112). Through the above operations, the route switching system 1 switches over the working path 61 to the backup path 63.

Second Embodiment

Configuration of Server

Hereinafter, descriptions will be provided on the second embodiment of the present invention.

Figure 4A:
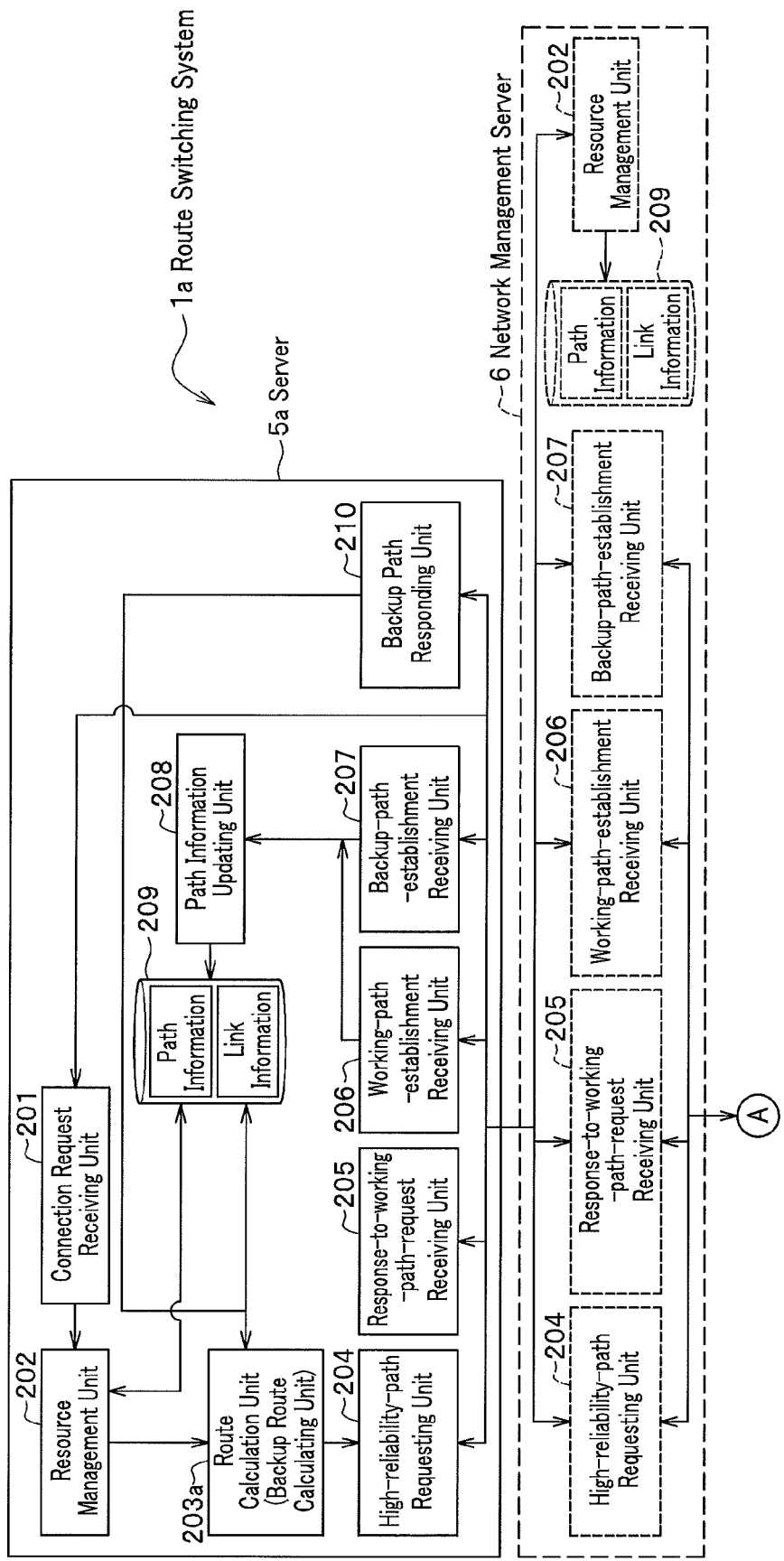
FIG. 4A is a block diagram showing each configuration of a server, a network management server, a source node apparatus, a relay node apparatus and a destination node apparatus according to a second embodiment of the present invention.
Figure 4B:
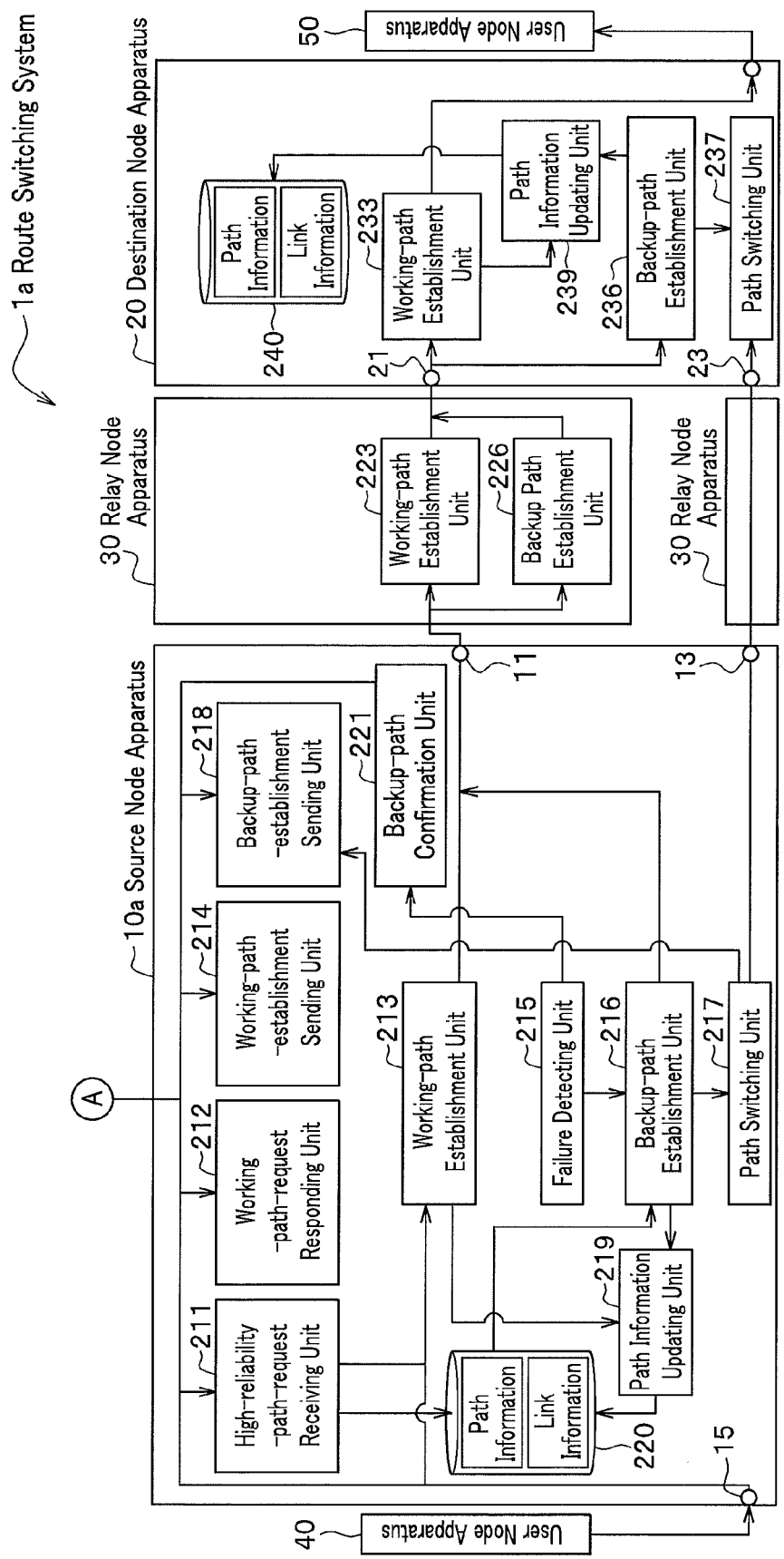
FIG. 4B is a block diagram showing each configuration of a server, a network management server, a source node apparatus, a relay node apparatus and a destination node apparatus according to a second embodiment of the present invention.

FIGS. 4A and 4B are block diagrams showing each configuration of a server, a network management server, a source node apparatus, a relay node apparatus and a destination node apparatus according to the second embodiment of the present invention.

As shown in FIG. 4A, the server 5a includes a connection-request receiving unit 201, a resource management unit 202, a route calculation unit (a backup route calculating unit) 203a, a high-reliability-path requesting unit 204, a response-to-working-path-request receiving unit 205, a working-path-establishment receiving unit 206, a backup-path-establishment receiving unit 207, a path information updating unit 208, a storage unit 209 and a backup-path responding unit 210.

The server 5a calculates a route for a backup path 63 when the source node apparatus 10a requests a calculation of the route for the backup path 63, which is a significant difference from the server 5 of FIG. 1. In FIG. 4A, the route calculation unit and the backup route calculation unit are illustrated as an integral unit, but may also be configured as separate units.

The backup-path responding unit 210 serves for receiving a confirmation request for the backup path 63 sent from the source node apparatus 10a.

When the backup-path responding unit 210 receives a confirmation request for the backup path 63, the route calculating unit 203a calculates a route for the backup path 63, and stores this in the path information of the storage unit 209. The confirmation request for this backup path 63 denotes a request such that the source node apparatus 10a requests the server 5a to calculate and send a route for the backup path 63. The route calculating unit 203a calculates a route for the working path 61 in the same manner as that of the route calculating unit 203 of FIG. 1. As such, since the server 5a calculates a route for the backup path 63 using the latest path information at the time of a failure occurrence, it is possible to reduce occasions of failure to establish the calculated backup path 63, compared with the case in which the backup path 63 is calculated in advanced.

Descriptions on the connection-request receiving unit 201, the resource management unit 202, the high-reliability-path requesting unit 204, the response-to-working-path-request receiving unit 205, the working-path-establishment receiving unit 206, the backup-path-establishment receiving unit 207, the path information updating unit 208 and the storage unit 209 will be omitted since these components have the same configurations as those in FIG. 2A.

[Configurations of Source Node Apparatus]

As shown in FIG. 4B, the source node apparatus 10a includes a high-reliability-path-request receiving unit 211, a working-path-request responding unit 212, a working-path establishing unit 213, a working-path establishment sending unit 214, a failure detecting unit 215, a backup-path establishing unit 216, a path switching unit 217, a backup-path-establishment sending unit 218, a path-information updating unit 219, a storage unit 220 and a backup-path confirmation unit 221.

The backup-path confirmation unit 221 serves for sending a confirmation request for confirming the backup path 63 to the server 5a when the failure detecting unit 215 detects a failure in the working path 61 of the core network 2.

Descriptions on the high-reliability-path-request receiving unit 211, the working-path-request responding unit 212, the working-path establishing unit 213, the working-path-establishment sending unit 214, the failure detecting unit 215, the backup-path establishing unit 216, the path switching unit 217, the backup-path-establishment sending unit 218, the path-information updating unit 219 and the storage unit 220 will be omitted since these components are same as those in FIG. 2B. The network management server 6, the relay node apparatus 30 and the destination node apparatus 20 are the same as those in FIGS. 2A and 2B, thus descriptions thereof will be omitted.

[Operations of Route Switching System]

FIG. 5 is a flow chart showing operations of the route switching system 1a of FIGS. 4A and 4B. Descriptions will be given on operations of the route switching system 1a to establish the working path 61 (see FIGS. 4A and 4B when necessary). Note that the network management server and the relay node apparatus are omitted in FIG. 5 and in the descriptions thereof hereinafter.

<Establishment of Working Path>

The operation of the server 5a to receive a connection request and the like, specifically the descriptions on Steps S1000 and S1002 of FIG. 5 are the same as Steps S101 and S102 of FIG. 3, thus descriptions thereof will be omitted. The server 5a calculates, through the route calculating unit 203a, a route for the working path 61 based on the path information stored in the storage unit 209, in response to a connection request received by the connection-request receiving unit 201.

Following the operation at Step S1003, the server 5a stores, through the route calculating unit 203a, the route for the working path 61 in the path information (Step S1004). The server 5a sends the source node apparatus 10, through the high-reliability-path requesting unit 204, a route for the working path 61 as well as an establishment request for establishing the working path 61 (Step S1005). The operations after the establishment request for establishing the working path 61 is sent, specifically, Steps S1006 to S1009 of FIG. 5 are the same as those at Steps S106 to S109 of FIG. 3, thus descriptions thereof will be omitted.

Following the operation at Step 1005, the source node apparatus 10a receives, through the high-reliability-path-request receiving unit 211, a route for the working path 61 and an establishment request for establishing the working path 61 from the server 5a (Step S2001). The source node 10a stores, through the high-reliability-path-request receiving unit 211, the received route for the working path 61 in the path information of the storage unit 220 (Step S2002). Descriptions on the operations after the path information regarding the working path 61, specifically, Steps S2003 to S2005 of FIG. 5 will be omitted since the operations thereof are the same as those at Steps S203 to S205 of FIG. 3.

When the operation at Step S2004 is executed, the destination node apparatus 20 establishes the working path 61 through the working-path establishing unit 233, in response to the working-path-establishment request sent from the source node apparatus 10a (Step S3001). Through the above operations, the route switching system 1a secures the working path 61 without calculating a route for the backup path 63.

<Switching Over to Backup Path>

Descriptions will be provided on operations of the route switching system 1a to switch over a working path 61 to a backup path 63 when a failure occurs in the working path 61 of the core network 2.

The source node apparatus 10a detects a failure of the core network 2 (Step S2006). The source node apparatus 10a sends the server 5a, through the backup-path confirmation unit 221, a confirmation request for confirming the backup path 63 when the failure detecting unit 215 detects a failure in the working path 61 of the core network 2 (Step S2007).

Following the operation at Step S2007, the server 5a receives, through the backup-path responding unit 210, the confirmation request for confirming the backup path 63 sent from the source node apparatus 10a (Step S1010). The server 5a calculates, through the route calculating unit 203a, a route for the backup path 63 (Step S1011), and stores this in the path information of the storage unit 209 (Step S1012). The server 5a sends, through the high-reliability-path requesting unit 204, the route for the backup path 63 to the source node apparatus 10a (Step S1013).

Following the operation at Step S1013, the source node apparatus 10a receives, through the high-reliability-path-request receiving unit 211, the route for the backup path 63 (Step S2008), and stores this in the path information of the storage unit 220 (Step S2009). The source node apparatus 10a sends, through the backup-path establishing unit 216, an establishment request for establishing the backup path 63 via the relay node apparatus 30 to the destination node apparatus 20, so as to establish the backup path 63 (Step S2010). Based on the operation at Step S2010, the destination node apparatus 20 establishes, through the backup-path establishing unit 236, the backup path 63 in response to the establishment request for establishing the backup path 63 sent from the source node apparatus 10 (Step S3002).

Following the operation at Step S2010, the source node apparatus 10a switches, through the path switching unit 217, the working path 61 over to the backup path 63 that is established by the backup-path establishing unit 216 (Step S2011). The operations after switching over to the backup path 63, specifically, at Steps S2012 to S2014 of FIG. 5 are the same as those at Steps S209 to S211 of FIG. 3, thus descriptions thereof will be omitted.

When the operation at Step S2011 is executed, the destination node apparatus 20 switches, through the path switching unit 237, the working path 61 over to the backup path 63 that is established by the backup-path establishing unit 236 (Step S3003). The operations after switching to the backup path 63, specifically, at Step S3004 and Step S3005 are the same as those Step S304 and Step S305 of FIG. 3, thus descriptions thereof will be omitted.

Following the operation at Step S2012, the server 5a receives, through the backup-path-establishment receiving unit 207, the route for the backup path 63 switched over the working path 61 by the source node apparatus 10a sent from the source node apparatus 10a (Step S1014). The operations after receiving the route for the backup path 63, specifically, at Step S1015 and Step S1016 are the same as those at Step S111 and Step S112 of FIG. 3, thus descriptions thereof will be omitted. Through the above operations, the route switching system 1a switches over the working path 61 to the backup path 63.

Each embodiment of the present invention has been described above, and the present invention is not limited to the above descriptions, and may be implemented within the scope thereof. For example, the server may calculate a route for a backup path every predetermined time period and sent it to the boundary node apparatus, and may also calculate a route for a backup path when a load of the server is lower, and send it to the boundary node apparatus.

In each embodiment, each server according to the present invention has been exemplified as a separate server, but in the present invention, a general computer may be operated by a program that functions each unit of the server. Such a program may be distributed through a communication line, or may be recorded in a storage medium such as a CD-ROM and flash memory to be distributed.

In each embodiment, the boundary node apparatus according to the present invention has been exemplified as a separate apparatus, but in the present invention, a general computer may be operated by a program that functions each unit of the boundary node apparatus. Such a program may be distributed through a communication line, or may be recorded in a storage medium such as a CD-ROM and flash memory to be distributed.

DESCRIPTION OF NUMERAL REFERENCES 1, 1a Route Switching System
2 Core Network
3, 4 Service Network
5 Server
6 Network Management Server
10 Source Node Apparatus
11, 13, 15 Interface
20 Destination Node Apparatus
21, 23, 25 Interface
30 Relay Node Apparatus
40, 50 User Node Apparatus
61 Working Path
63 Reservation Path
201 Connection-request Receiving Unit
202 Resource Management Unit
203, 203a Route Calculating Unit (Reservation Route Calculating Unit)
204 High-confidence-path Requesting Unit
205 Response-to-working-path-request Receiving Unit
206 Working-path-establishment Receiving Unit
207 Reservation-path-establishment Receiving Unit
208, 219, 239 Path-information Updating Unit
209, 220, 240 Storage Unit
210 Reservation-Path Responding Unit
211 High-confidence-path-request Receiving Unit
212 Working-path-request Responding Unit
213, 223, 233 Working-path Establishment Unit
214 Working-path-establishment Sending Unit
215 Failure Detecting Unit
216, 226, 236 Backup-path Establishment Unit
217, 237 Path Switching Unit
218 Backup-path-establishment Sending Unit
221 Reservation-path Confirmation Unit

What is claimed is:

1. A route switching method for switching a route in a core network that accommodates service networks including user node apparatuses by use of a server storing path information that includes, in every time frame, a route for a working path and a route for a backup path to be switched over from the working path, both of the working path and the backup path established between two boundary node apparatuses each of which is located on a boundary between the service network and the core network, the method comprising:
performed by the server,
a connection request receiving step for receiving from one of the user node apparatuses a connection request for connecting to the core network,
a route calculation step, in response to this connection request, for confirming available resources in the path information and calculating a route for the working path and a route for the backup path based on the path information, and
a high-reliability-path requesting step for sending the boundary node apparatus the calculated routes for the working path and for the backup path along with an establishment request for establishing the working path;
performed by the boundary node apparatus,
a working path establishing step, in response to a working-path-establishment request, for establishing the working path calculated by the server between the boundary node apparatuses via relay node apparatuses that relay the core network, and
a failure detection step for detecting a failure in the core network;
when a failure is detected in the core network, performed by the boundary node apparatus,
a backup path establishment step, based on the route for the backup path calculated by the server, for establishing the backup path between the boundary node apparatuses via the relay node apparatuses,
a path switching step for switching over the working path to the backup path established, and
a backup-path-establishment sending step for sending the server the route for the backup path switched over from the working path; and
performed by the server,
a backup path establishment receiving step for receiving the route for the backup path switched over from the working path by the boundary node apparatus, and
a path information updating step for updating the path information based on the route for the backup path switched over from the working path by the boundary node apparatus.

2. A route switching method for switching a route in a core network that accommodates service networks including user node apparatuses by use of a server storing path information that includes, in every time frame, a route for a working path and a route for a backup path to be switched over from the working path, both of the working path and the backup path established between two boundary node apparatuses each of which is located on a boundary between the service network and the core network, the method comprising:
performed by the server,
a connection request receiving step for receiving from one of the user node apparatuses a connection request for connecting to the core network,
a route calculation step, in response to the connection request, for confirming available resources based on the path information and calculating a route of the working path, and a high-reliability-path request step for sending the boundary node apparatus the calculated routes for the working path and an establish request for establishing the working path;

performed by the boundary node apparatus, a working-path establishment step, in response to a working-path-establishment request, for establishing the working path calculated by the server between the boundary node apparatuses via relay node apparatuses that relay the core network, and a failure detecting step for detecting a failure in the core network;

when a failure is detected in the core network, performed by the boundary node apparatus, a step for sending the server a backup path confirmation request;

performed by the server, a backup route calculating step for calculating a route for the backup path in response to the backup path confirmation request sent from the boundary node apparatus, and a backup path responding step for sending the boundary node apparatus the calculated route for the backup path;

performed by the boundary node apparatus, a backup path establishing step for establishing the backup path between the boundary node apparatuses via the relay node apparatuses based on the route for the backup path received from the server, a path switching step for switching over the working path to the backup path established, and a backup-path-establishment sending step for sending the server the route for backup path switched over from the working path; and performed by the server, a backup-path-establishment receiving step for receiving a route for the backup path switched over from the working path by the boundary node apparatus, and a path information updating step for updating the path information based on the route for the backup path switched over from the working path by the boundary node apparatus.

3. A server coupled with a core network that accommodates service networks including user node apparatuses, the server for storing path information that includes, in every time frame, a route for a working path and a route for a backup path, both of the working path and the backup path established between two boundary node apparatuses, for a source node and a destination node, each of which is located on a boundary between the service network and the core network, and calculating a route for the working path and a route for the backup path to be switched over from the working path when a failure occurs in the core network, the server comprising:

a connection-request receiving unit for receiving from one of the user node apparatuses a connection request for connecting to the core network;

a route calculating unit, in response to the connection request, for calculating a route for the working path and a route for the backup path based on the path information;

a high-reliability-path requesting unit for sending the source node apparatus the calculated routes for the working path and for the backup path along with an establishment request for establishing the working path;

a backup-path-establishment receiving unit for receiving from the source node apparatus the route for the backup path switched over from the working path by the source node apparatus when a failure occurs in the core network; and a path-information updating unit for updating the path information based on the route for the backup path switched over from the working path by the source node apparatus.

4. The server as claimed in claim 3, further comprising:

a resource management unit for managing the path information including a route for a reservation path established between the boundary node apparatuses at a reservation time that is preset, a status of the reservation path indicating either "reserved" or "established", and the reservation time, wherein the high-reliability-path requesting unit sends the route and the reservation time for the reservation path that are managed by the resource management unit to the source node apparatus.

5. A server coupled with a core network that accommodates service networks including user node apparatuses, the server for storing path information that includes, in every time frame, a route for a working path and a route for a backup path, both of the working path and the backup path established between two boundary node apparatuses, for a source node and a destination node, each of which is located on a boundary between the service network and the core network, and calculating a route for the working path and a route for the backup path to be switched over from the working path when a failure occurs in the core network, the server comprising:

a connection-request receiving unit for receiving from one of the user node apparatuses a connection request for connecting to the core network;

a route calculating unit, in response to the connection request, for calculating a route for the working path based on the path information;

a backup path-route calculating unit for calculating a route for the backup path in response to a confirmation request for confirming the backup path sent from the source node apparatus when a failure is detected in the core network;

a high-reliability-path requesting unit for sending the source node apparatus the calculated routes for the working path and the backup path along with an establishment request for establishing the working path;

a backup-path-establishment receiving unit for receiving from the source node apparatus the route for the backup path switched over from the working path by the source node apparatus when a failure occurs in the core network; and a path-information updating unit for updating the path information based on the route for the backup path switched over from the working path by the source node apparatus.

6. The server as claimed in claim 5, further comprising:

a resource management unit for managing the path information including a route for a reservation path established between the boundary node apparatuses at a reservation time that is preset, a status of the reservation path indicating either "reserved" or "established", and the reservation time, wherein the high-reliability-path requesting unit sends the route and the reservation time for the reservation path that are managed by the resource management unit to the node apparatus.

7. A boundary node apparatus, in response to an establishment request for establishing a working path sent from a server, for establishing a working path with another boundary node apparatus, each of which is located on a boundary between a service network including a user node apparatus and a core network that accommodates the service network;

the boundary node apparatus comprising:

a working-path establishing unit, in response to the establishment request for establishing the working path, for establishing the working path calculated by the server between the boundary node apparatus and another boundary node apparatus via relay node apparatuses that relay the core network;

a failure detecting unit for detecting a failure in the core network while the working path is being established;

a backup-path establishing unit for establishing the backup path between the boundary node apparatus and the another boundary node apparatus, based on a route for the backup path switched over from the working path received from the server when the failure detecting unit detects a failure in the core network;

a path switching unit for switching over the working path to the backup path established; and a backup-path-establishment sending unit for sending the server the route for the backup path switched over from the working path.

8. The boundary node apparatus as claimed in claim 7, wherein the boundary node apparatus receives from the server a route for a reservation path to be established with the another boundary node apparatus at a reservation time, and the working path establishing unit establishes the reservation path between the boundary node apparatus and the another boundary node apparatus.

9. A boundary node apparatus, in response to an establishment request for establishing a working path sent from a server, for establishing a working path with another boundary node apparatus, each of which is located on a boundary between a service network including a user node apparatus and a core network that accommodates the service network;

the boundary node apparatus comprising:

a working-path establishing unit, in response to the establishment request for establishing the working path, for establishing the working path calculated by the server between the boundary node apparatus and another boundary node apparatus via relay node apparatuses that relay the core network;

a failure detecting unit for detecting a failure in the core network while the working path is being established;

a backup path confirmation unit for sending a confirmation request for confirming the backup path switched over from the working path by the server when the failure detecting unit detects a failure in the core network;

a backup-path establishing unit for establishing the backup path between the boundary node apparatuses via the relay node apparatus based on the route for the backup path received from the server;

a path switching unit for switching over the working path to the backup path established; and a backup-path-establishment sending unit for sending the server the route for the backup path switched over from the working path.

10. The boundary node apparatus as claimed in claim 9, wherein the boundary node apparatus receives from the server a route for a reservation path to be established with the another boundary node apparatus at a reservation time, and the working path establishing unit establishes the reservation path between the boundary node apparatus and the another boundary node apparatus.

11. A route switching system comprising the server as claimed in claim 3 and a boundary node apparatus, in response to an establishment request for establishing a working path sent from a server, for establishing a working path with another boundary node apparatus, each of which is located on a boundary between a service network including a user node apparatus and a core network that accommodates the service network;

the boundary node apparatus comprising:

a working-path establishing unit, in response to the establishment request for establishing the working path, for establishing the working path calculated by the server between the boundary node apparatus and another boundary node apparatus via relay node apparatuses that relay the core network;

a failure detecting unit for detecting a failure in the core network while the working path is being established;

a backup-path establishing unit for establishing the backup path between the boundary node apparatus and the another boundary node apparatus, based on a route for the backup path switched over from the working path received from the server when the failure detecting unit detects a failure in the core network;

a path switching unit for switching over the working path to the backup path established; and a backup-path-establishment sending unit for sending the server the route for the backup path switched over from the working path.

12. A route switching system comprising the server as claimed in claim 3 and a boundary node apparatus for establishing, in response to an establishment request for establishing a working path sent from a server, for establishing a working path with another boundary node apparatus, each of which is located on a boundary between a service network including a user node apparatus and a core network that accommodates the service network;

the boundary node apparatus comprising:

a working-path establishing unit, in response to the establishment request for establishing the working path, for establishing the working path calculated by the server between the boundary node apparatus and another boundary node apparatus via relay node apparatuses that relay the core network;

a failure detecting unit for detecting a failure in the core network while the working path is being established;

a backup path confirmation unit for sending a confirmation request for confirming the backup path switched over from the working path by the server when the failure detecting unit detects a failure in the core network;

a backup-path establishing unit for establishing the backup path between the boundary node apparatuses via the relay node apparatus based on the route for the backup path received from the server;

a path switching unit for switching over the working path to the backup path established; and a backup-path-establishment sending unit for sending the server the route for the backup path switched over from the working path.

13. A route switching system comprising the server as claimed in claim 5 and a boundary node apparatus, in response to an establishment request for establishing a working path sent from a server, for establishing a working path with another boundary node apparatus, each of which is located on a boundary between a service network including a user node apparatus and a core network that accommodates the service network;

the boundary node apparatus comprising:
- a working-path establishing unit, in response to the establishment request for establishing the working path, for establishing the working path calculated by the server between the boundary node apparatus and another boundary node apparatus via relay node apparatuses that relay the core network;
- a failure detecting unit for detecting a failure in the core network while the working path is being established;
- a backup-path establishing unit for establishing the backup path between the boundary node apparatus and the another boundary node apparatus, based on a route for the backup path switched over from the working path received from the server when the failure detecting unit detects a failure in the core network;
- a path switching unit for switching over the working path to the backup path established; and
- a backup-path-establishment sending unit for sending the server the route for the backup path switched over from the working path.

14. A route switching system comprising the server as claimed in claim 5 and a boundary node apparatus, in response to an establishment request for establishing a working path sent from a server, for establishing a working path with another boundary node apparatus, each of which is located on a boundary between a service network including a user node apparatus and a core network that accommodates the service network;

the boundary node apparatus comprising:
- a working-path establishing unit, in response to the establishment request for establishing the working path, for establishing the working path calculated by the server between the boundary node apparatus and another boundary node apparatus via relay node apparatuses that relay the core network;
- a failure detecting unit for detecting a failure in the core network while the working path is being established;
- a backup path confirmation unit for sending a confirmation request for confirming the backup path switched over from the working path by the server when the failure detecting unit detects a failure in the core network;
- a backup-path establishing unit for establishing the backup path between the boundary node apparatuses via the relay node apparatus based on the route for the backup path received from the server;
- a path switching unit for switching over the working path to the backup path established; and
- a backup-path-establishment sending unit for sending the server the route for the backup path switched over from the working path.

15. A non-transitory computer readable medium storing computer instructions for controlling a computer to function as each unit constituting the server as claimed in claim 3.

16. A non-transitory computer readable medium storing computer instructions for controlling a computer to function as each unit constituting the server as claimed in claim 5.

17. A non-transitory computer readable medium storing computer instructions for controlling a computer to function as each unit constituting the server as claimed in claim 4.

* * * * *